United States Patent
Chang

(10) Patent No.: US 7,434,285 B1
(45) Date of Patent: Oct. 14, 2008

(54) ADJUSTABLE FLOW PULSATING POOL SWEEP

(76) Inventor: Paul C. Chang, 2473 San Saba St., Tustin, CA (US) 92782

( * ) Notice: Subject to any disclaimer, the term of this patent is extended or adjusted under 35 U.S.C. 154(b) by 0 days.

(21) Appl. No.: 12/074,023

(22) Filed: Mar. 1, 2008

(51) Int. Cl.
*E04H 4/16* (2006.01)

(52) U.S. Cl. .......................................... 15/1.7

(58) Field of Classification Search ............. 15/1.7
See application file for complete search history.

(56) References Cited

U.S. PATENT DOCUMENTS

| | | | |
|---|---|---|---|
| 4,742,593 A | 5/1988 | Kallenbach | |
| 5,033,148 A | 7/1991 | Chauvier et al. | |
| 5,337,433 A | 8/1994 | Gould et al. | |
| 5,384,928 A | 1/1995 | Khoury | |
| 5,604,950 A | 2/1997 | Stern | |
| 5,634,229 A | 6/1997 | Stoltz | |
| 5,655,246 A | 8/1997 | Chang | |
| 6,098,228 A | 8/2000 | Chang | |
| 6,112,354 A * | 9/2000 | Stoltz et al. | 15/1.7 |
| 6,615,864 B2 | 9/2003 | Chang | |
| 2006/0042688 A1 | 3/2006 | Sebor | |

FOREIGN PATENT DOCUMENTS

EP          380421     *  8/1990

* cited by examiner

*Primary Examiner*—Mark Spisich
(74) *Attorney, Agent, or Firm*—Gordon K. Anderson

(57) ABSTRACT

An adjustable pulsating submersible (10) is taught consisting of, a lower pool sweep body (20) with a resilient skirt (22) attached underneath. An integrated valve (50) is positioned within the lower pool sweep body and is used to accomplish a preliminary pre-selected flow adjustment. An upper pool sweep body (88) is placed over the integrated valve and is attached to the lower pool sweep body with threads in no more than one quarter turn. A flow adjuster (102) is slid tightly into upper pool sweep body and includes a number of first flow openings (104). A flow gate (106) is slid onto the flow adjuster and may rotate within limits with the flow adjuster. The flow gate incorporates a number of second flow openings (108) aligned with the first flow openings, when the flow adjuster is manually rotated the second flow openings misalign with the first flow openings providing precise adjustable flow operation.

19 Claims, 6 Drawing Sheets

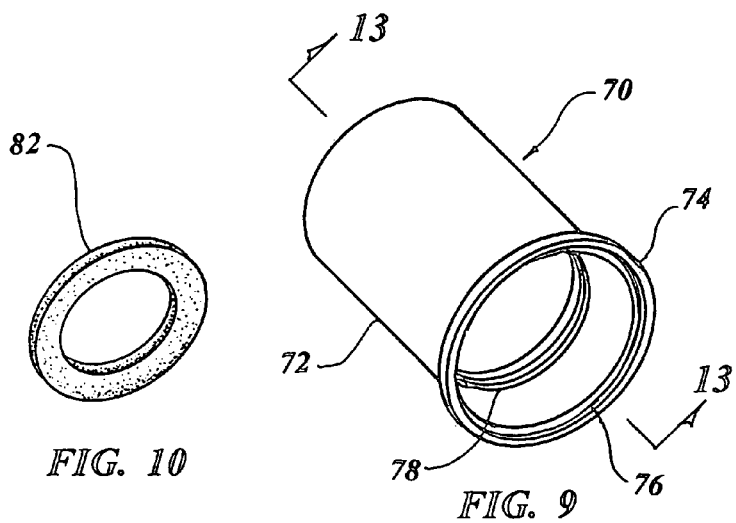
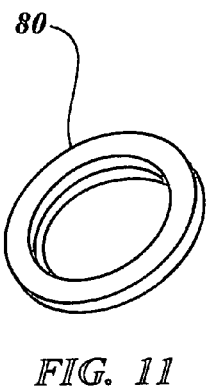
FIG. 10  FIG. 9  FIG. 11
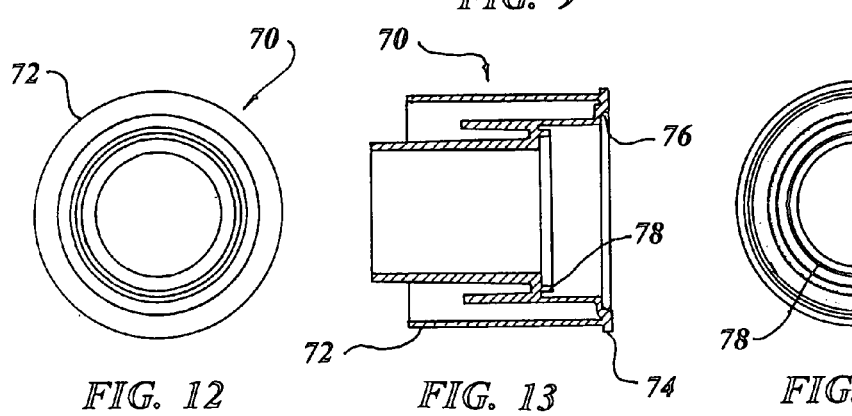
FIG. 12  FIG. 13  FIG. 14
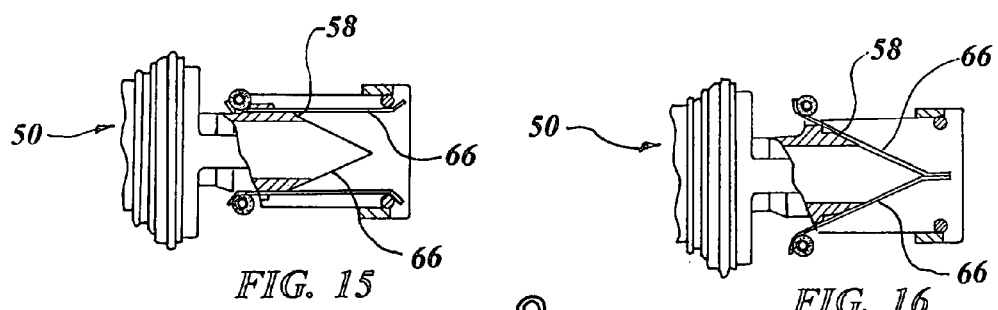
FIG. 15  FIG. 16
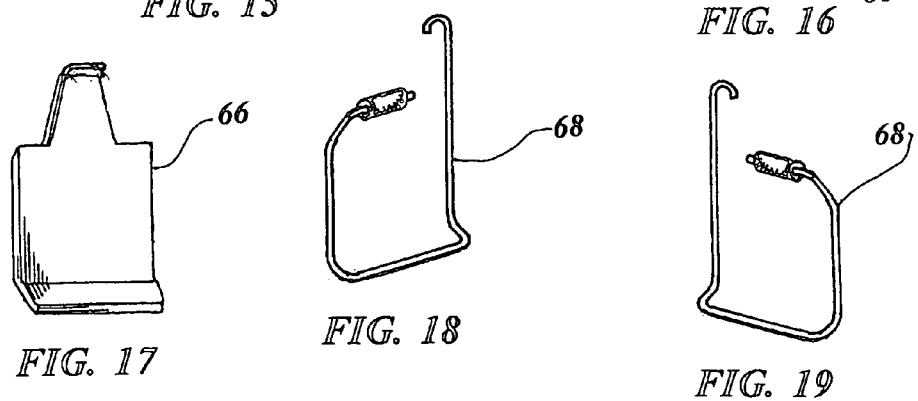
FIG. 17  FIG. 18  FIG. 19

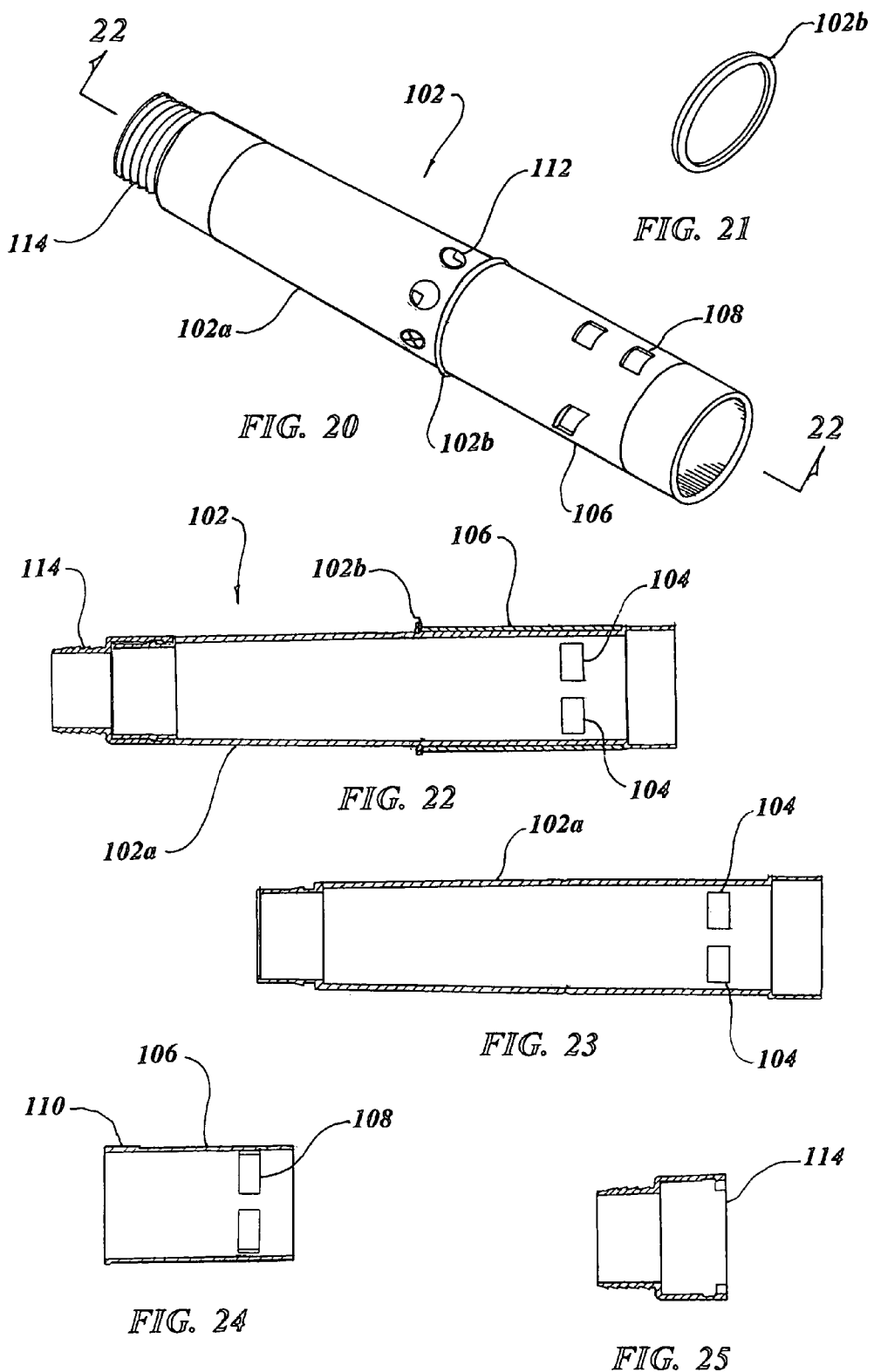

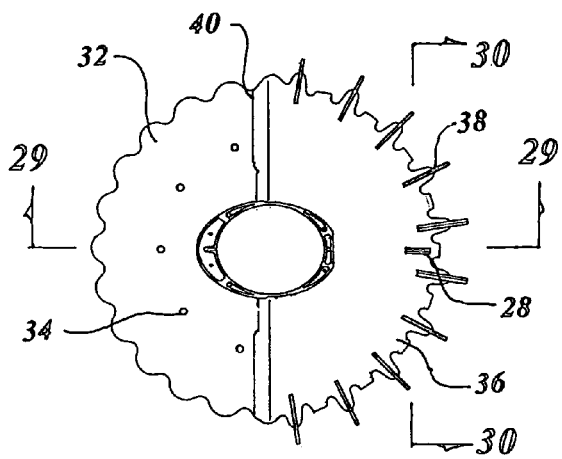
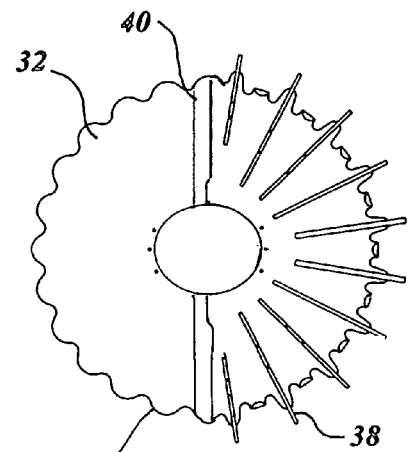
FIG. 26  FIG. 27
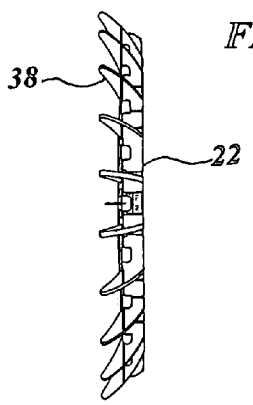
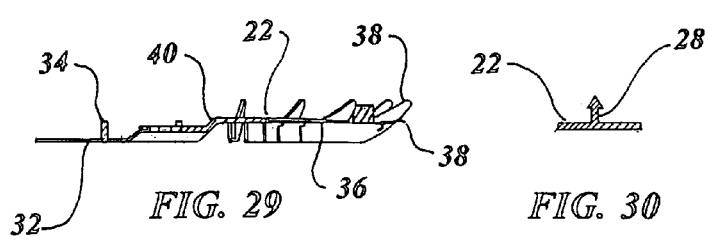
FIG. 28  FIG. 29  FIG. 30
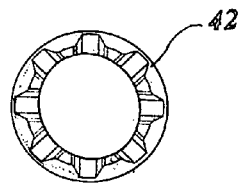 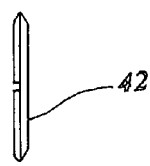 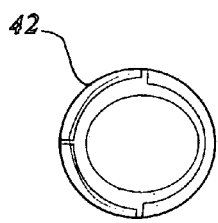
FIG. 31  FIG. 32  FIG. 33
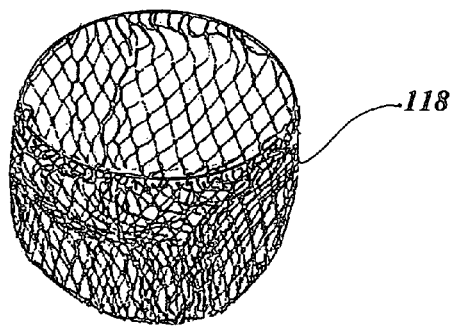
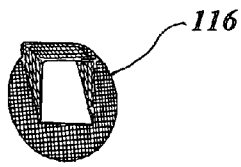
FIG. 34  FIG. 35

ADJUSTABLE FLOW PULSATING POOL SWEEP

TECHNICAL FIELD

The present invention relates to swimming pool cleaning devices in general. More specifically to a flow adjustable submersible pulsating pool sweep actuated by hydraulic pressure reacting with torsion spring loaded valve plates in combination with an adjustable hydraulic pressure opening relief valve having regulated flow control openings.

BACKGROUND ART

Previously, many types of pool cleaners have been used in endeavoring to provide an effective means for producing a pulsating effect with a submersible pulsating pool cleaner to propel the sweep of cleaner around the pool bottom and sides using the suction of the pool cleaner pump for removing debris and foreign matter from the swimming pool. A myriad of types of cleaners and sweeps have been employed in the past causing the interruption of induced flow due to kinetic energy of the water flow transferring force to the cleaner using the inertia of the fluid, which in turn promotes the desired linear movement and propulsion.

The prior art listed below did not disclose patents that possess any of the novelty of the instant invention; however the following U.S. patents are considered related:

| U.S. Pat. No. | Inventor | Issue Date |
| --- | --- | --- |
| 4,742,593 | Kallenbach | May 10, 1988 |
| 5,033,148 | Chauvier et al. | Jul. 23, 1991 |
| 5,337,433 | Gould et al. | Aug. 16, 1994 |
| 5,384,928 | Khoury | Jan. 31, 1995 |
| 5,634,229 | Stoltz | Jun. 3, 1997 |
| 5,604,950 | Stem | Feb. 25, 1997 |
| 5,655,246 | Chang | Aug. 12, 1997 |
| 6,098,228 | Chang | Aug. 8, 2000 |
| 6,615,864 B2 | Chang | Sep. 9, 2003 |
| Patent Application Publication | | |
| 2006/0042688 | Sebor | Mar. 2, 2006 |

U.S. Pat. No. 4,742,593 issued to Kallenbach discloses a valve member for a water interruption pool cleaner installed with the operating head between an open mouth and the hose connection. The valve has a tubular body of flexible material that assumes a collapsed condition over a segment thereof in absence of a pressure differential across the wall. Along the collapsed segment, the body has diverging interior walls in the direction of water flow. Longitudinal ribbing on each side of the body may be provided for reinforcement.

Chauvier et al. in U.S. Pat. No. 5,033,148 teaches a pool cleaner with a flapper valve that pivotally displaces to transfer water flow from one passage to another automatically. A bypass valve is required to regulate the suction pressure.

Gould et al. teaches in U.S. Pat. No. 5,337,433 a valve having an entrance mouth with one or more single acting closure lips pivoting between open and closed position. The lips are drawn into full closure by the suction of the pool pump and open when the bias is substantially less than the closing force.

U.S. Pat. No. 5,384,928 issued to Khoury is for a valve for a pool cleaner which is suitable for use in a fluid controlled swimming pool cleaner. The valve is made of a resiliently deformable material having a tubular core with a fastening formation near one end and a mushroom shaped annular flexible component at an opposite end.

Stoltz in U.S. Pat. No. 5,634,229 discloses a cleaner with two inlet openings each having a valve with jaw-like lips of a flexible material biased in an open position by its inherent elasticity and resiliency. The lips close under negative pressure and reopen due to the material establishing its inherent memory.

Stern in U.S. Pat. No. 5,604,950 teaches cleaner with a suction nozzle having a body with a throat extending from an inlet at one end to an outlet on the other. The body is split into a number of discrete portions forming a throat. One body portion is moveable allowing the throat to automatically expand in response to movements of other body portions. The resulting expansion of the nozzle allows unrestricted passage of large foreign objects through the throat during the operation of the suction cleaning device.

U.S. Pat. No. 5,655,246 issued to Chang is my first patent which has structure upon which improvements of the instant invention are based afforded by prototype development and exhaustive testing over the past decade. This patent discloses a pulsating submergible pool cleaner with a hollow body connected to a pool filtration pump through a flexible hose. An integrated reed valve and relief valve receive the full flow of water from the pump with the valve closing forcing the relief valve to open generating hydraulic cyclic pulsations. An inlet mounting foot is attached to the body and a debris removing disc is connected therebetween. Debris is removed and ingested into the cleaner by the scrubbing action of the disc combined with high velocity water flow entering the body under the disc through adjustable passageways.

U.S. Pat. No. 6,098,228 of Chang is for a diaphragm valve for a pool cleaner which utilizes a conventional cleaning head attached with a mounting foot to a cleaning disc. A screen is inserted into the foot and an outer sleeve is mounted within the head leaving a gap in between. A restricting jacket is mounted on the sleeve and is urged into a position that restricts a water flow path from the gap by an adjustable bypass valve superimposed on the jacket, a compression spring maintains the jacket position and a valve diaphragm receives pool water from a pool pumping system and oscillates open and closed causing the cleaner to be propelled by hydraulic pulsation.

Chang in U.S. Pat. No. 6,615,864 B2 is my most recent prior art patent which improvements in the reed valve have been taught and are included in the instant invention in part. The reed valve utilizes a pair of opposed rigid valve plates. The rigid valve plates are angularly juxtaposed within the valve inlet end which contiguously rest upon a fulcrum and restricting boundaries therefore opposed blades rotate inwardly on the fulcrum point until distal ends engage each other when negative pressure is applied. Torsion springs surround each restricting boundary and interface with each valve plate returning them to a parallel position when fluid pressure is terminated. A resilient sleeve is positioned on each spring eliminating a metal to metal contact with the valve plate.

Patent Application Publication No. 2006/0042688 of Sebor teaches a fluid flow regulator for use in pool suction cleaners. A bypass is connected to a flow passage conduit injecting ambient fluid into the bypass flow passage. A valve operates within the bypass flow passage with a spring carried within the bypass passage urging the valve into a seated position. An adjustment knob acts upon the spring by modifying a biasing force urging the valve toward the seated position in opposition to pressure within the flow passage urging the valve into an open position.

DISCLOSURE OF THE INVENTION

One of the basic problems of pool sweeps or also called pool cleaners deals with the lack of ability, of most pool cleaners in general, to adjust the sweeping capacity capabilities to coincide with the requirements of the specific pool. If the pool sweep is only available in one size it may be too small some pools and too large for others which could waste energy or become inefficient when sweeping the pool as it bypasses the balance of the pumps capabilities.

It is therefore a primary object of the invention to address the pool size requirements by utilizing a sweeper that may be employed with almost all conventional sized residential pools. Each pool requires a water filtration system that pumps water out of the pool and through a series of filters which are sized to correspond to the volume of the pool or its basic size. The volume of water flow is determined by the horsepower of and efficiency of the pump as an example a common pump normally handles 30 to 80 gallons of water per minute. In the invention full flow is handled through the reed valve portion of the integrated valve and when the valve closes the flow is directed to the adjuster portion of the valve which may be set manually to meet the particular requirements of the pool filtration system.

To overcome the above problem, the invention incorporates dual adjustment of an integrated valve in the sweep which functions in two separate modes of operation. First a preliminary adjustment of the valve is accomplished prior to use where the valve is dissembled by turning the upper pool sweep body no more than one quarter turn and removing the valve and manually setting the spring by twisting the spring into the appropriate groove in the outlet tube. If the pool has a water flow rate of from 70 to 80 gallons per minute the first or upper groove is utilized which is the weakest compressive force. A flow rate of from 50 to 70 gallons per minute in the pool pumping system requires the spring to be adjusted within the second or middle groove. When the flow rate is from 30 to 50 gallons per minute the third or lower groove is utilized which is the highest compressive force. This preliminary adjustment permits the sweep to approximate a balance with the piping system.

The second or fine tuning adjustment may be accomplished without removing any components and is achieved by manually rotating the flow adjuster with one hand while holding upper body in the other hand. A pointer is formed in the upper body with symbols formed in the flow adjuster which correspond with the position of the flow openings. The symbols relate to the openings which include full open, half open, quarter open and completely closed and may be set at any position in between. When the flow adjuster is manually rotated second flow openings in a flow gate misalign with first flow openings in the adjuster body providing a precise flow rate within the submersible swimming pool sweep that corresponds exactly with pool requirements.

The fine tuning adjustment is particularly important as the pool user may actually adjust the pool sweep by hand when it becomes apparent that the speed of movement of the sweep has decreased or changed from normal. It is common for the pool filter to become clogged and decrease the water flow from the system due to normal debris accumulated on the filtration surface. This anomaly is particularly apparent during summer months when suntan oil, grease and lotion are released from the pool user's skin and accumulate in the filter media. The pool user simply holds the upper pool sweep body under the water with one hand and adjusts the flow setting with the other hand by slowly twisting flow adjuster while visualizing the movement which requires little effort and is an intuitively obvious procedure.

Another feature that enhances this fine tuning adjustment is that optionally the upper pool sweep body may be transparent permitting the user to actually visualize the position of the flow openings and their interrelationship as the rotation of the adjuster effects the opening size.

Of equal importance is in the inventions ability to answer the inherent problem plaguing submersible pool sweeps for decades which has been the reliability of the commonly used internal valves used to create the pulsation effect for propelling the sweeper on the bottom and sides of a swimming pool. The reason for inherent short life of the valves of any type is that the pulsation or cyclic action can be as high as 6 cycles per second which creates fatigue in the base material regardless of its composition. This phenomenon occurs in flappers, flexible diaphragms, flexible jaws, elastomeric jaws as well as metallic reed valves.

Therefore the second primary object of the invention is to utilize a valve within the sweeper that, by its very nature, is robust and durable which resolves this problem of reliability completely. This object is accomplished by using opposed a pair of non-flexing reed valve plates made of stainless steel having a thickness that withstands the cyclic movement without bending utilized in combination with torsion springs also of stainless steel that are stiff enough to return the valves to their open position with a minimum of bending moment.

An important reason that helps to overcome the reliability problem is that the valve plates used in the invention are surrounded by restricting boundaries on three sides with the end next to the valve body retained by a torsion spring. This arrangement positions each valve plate always in the same location and the valve plate pivots on a fulcrum point rather than bending. Since the valve plate is always flat and no deflection or curving occurs the valve plate is not under stress and will function properly for extremely long periods of time. A prototype of the invention has been under test for some time with little visual wear or signs of deterioration with no malfunctions.

Another object of the valve used in the invention is the design has basically no moving metal to metal communication as the torsion springs are isolated with resilient sleeves and the valve plates only touch the thermoplastic parts of the body. It is possible however, for the valve plates to barely contact a horizontal side of the torsion spring on their outside surface when the valve plate is fully open but it should be realized that no stress or force is applied at that time when the torsion spring is at rest.

Still another object of the invention is directed to the simplicity of the valve plate itself as it is stamped in the finished shape and two bends in the metal are formed by a conventional machine tool press brake.

Yet another object of the invention is in the configuration of the valve body which in the unlikely advent that the reed valve plate must be replaced the procedure is extremely simple. The valve body is removed from the cleaner housing by rotating and removing the upper pool sweep body exposing the integrated valve and when removed the torsion spring may be lifted up with ones finger releasing the valve plate allowing it to slide out of the restricting boundaries. Replacement is just the reverse procedure which is intuitively obvious to the user.

An optional feature of the invention includes a leaf catching screen that removeably fits over the pool sweep and catches the large debris and is easily removed for cleaning.

Further a bypass flow screen may be utilized to protect the fine tuning openings from clogging.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 9 is an isometric view of the relief valve in the preferred embodiment.

FIG. 10 is a partial isometric view of the relief valve floating gasket in the preferred embodiment.

FIG. 11 is a partial isometric view of the preferred relief valve cap.

FIG. 12 is a left end view of the relief valve in the preferred embodiment.

FIG. 13 is a cross sectional view taken along lines 13-13 of FIG. 9.

FIG. 14 is a right end view of the relief valve in the preferred embodiment.

FIG. 15 is a cutaway side view of the integrated valve partially taken along an arbitrary centerline in cross section illustrating the valve plates in their fully open position.

FIG. 16 is a cutaway side view of the integrated valve partially taken along an arbitrary centerline in cross section illustrating the valve plates in their fully closed position.

FIG. 17 is a partial isometric view of one of the valve plates in the preferred embodiment.

FIG. 18 is a partial isometric view of the left hand torsion spring in the preferred embodiment completely removed from the invention for clarity.

FIG. 19 is a partial isometric view of the right hand torsion spring in the preferred embodiment completely removed from the invention for clarity.

FIG. 20 is a partial isometric view of the flow adjuster in the preferred embodiment.

FIG. 21 is a partial isometric view of the flow adjuster retaining ring in the preferred embodiment.

FIG. 22 is a cross sectional view taken along lines 22-22 of FIG. 21.

FIG. 23 is a cross section view of the flow adjuster taken along an arbitrary centerline.

FIG. 24 is a cross section view of the flow gate taken along an arbitrary centerline.

FIG. 25 is a cross section view of the flow adjuster swivel joint taken along an arbitrary centerline.

FIG. 26 is a top plan view of the resilient skirt in the preferred embodiment.

FIG. 27 is a bottom view of the resilient skirt in the preferred embodiment.

FIG. 28 is a side view of the resilient skirt in the preferred embodiment.

FIG. 29 is a cross sectional view taken along lines 29-29 of FIG. 26.

FIG. 30 is a cross sectional view taken along lines 30-30 of FIG. 26 illustrating the arm attaching upstanding finger.

FIG. 31 is a top view of the shoe for attaching the skirt to the lower body.

FIG. 32 is a side view of the shoe for attaching the skirt to the lower body.

FIG. 33 is a bottom view of the shoe for attaching the skirt to the lower body.

FIG. 34 is a partial isometric view of the leaf catching screen in the preferred embodiment.

FIG. 35 is a partial isometric view of the bypass flow screen in the preferred embodiment.

BEST MODE FOR CARRYING OUT THE INVENTION

Figure 1:
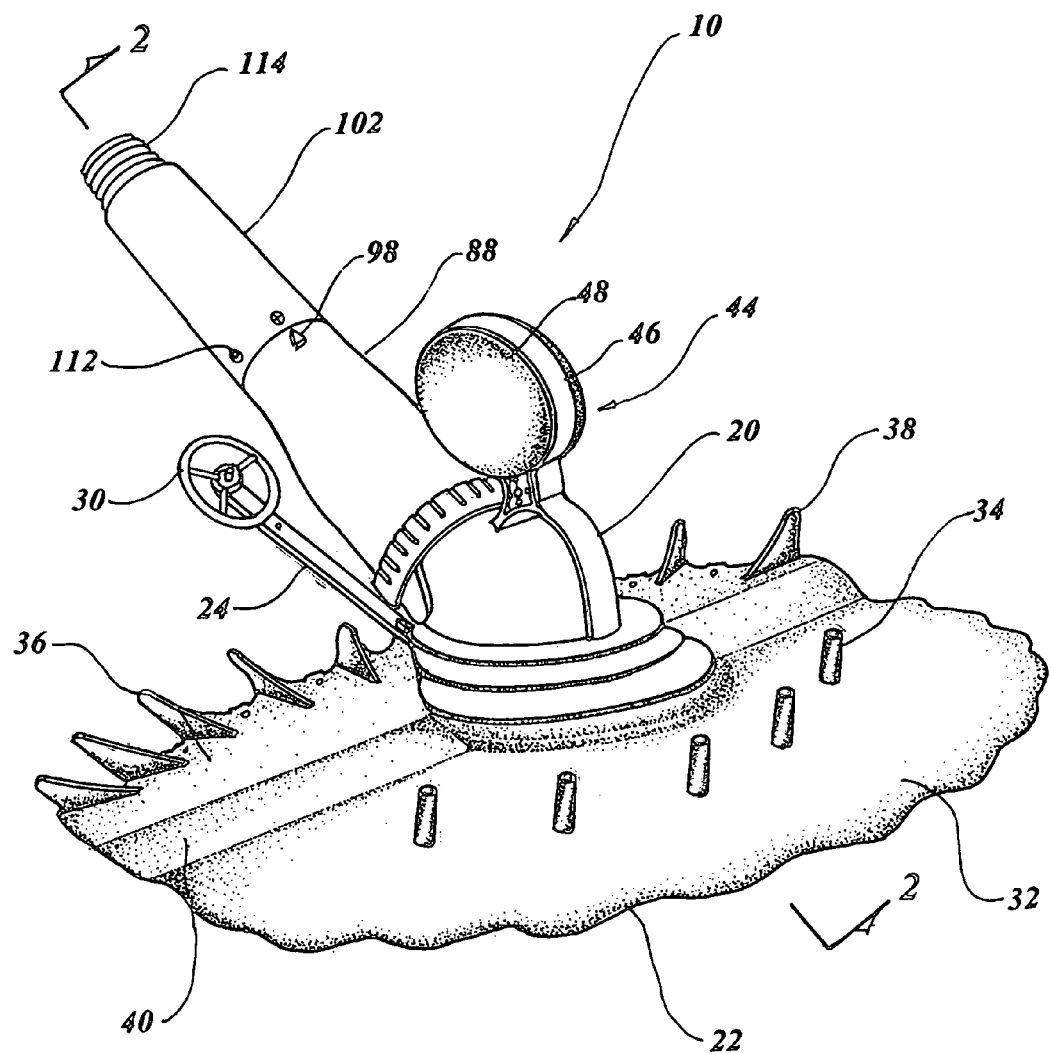
FIG. 1 is a partial isometric view of the pulsating pool sweep in the preferred embodiment

The best mode for carrying out the invention is presented in terms of a preferred embodiment for an adjustable flow pulsating pool sweep 10. This preferred embodiment is shown in FIGS. 1 thorough 35 and consists of a lower pool sweep body 20 having a resilient skirt 22 attached underneath, as illustrated in FIGS. 1-3 and 26-29. A hinged deflector arm 24 is attached to the lower pool sweep body 20 with a hinge joint 26 and the resilient skirt 22. An arm attaching upstanding finger 28 formed in an arrow head shape, as shown in the FIG. 30, and attaches the arm 24 to the skirt 22.

The distal end of the hinged deflector arm 24 incorporates a rotatable deflector wheel 30, such that when the pool sweep 10 is being propelled within a pool, direction is changed when the wheel 30 touches an obstruction permitting the pool sweep 10 to continue operation.

The resilient skirt 22 includes a flat rear portion 32, with a plurality of posts 34, and a raised front portion 36, having a plurality of integrally formed fins 38, with an offset 40 in-between permitting debris to be swept from pool walls and bottom by turbulent water flow across the raised portion while the rear portion of the resilient skirt holds the pool cleaner tightly against submerged surfaces of a pool with negative pressure created by a pool filtration systems as it extracts water from beneath the resilient skirt. A shoe 42 is provided to attach the resilient skirt 22 to the lower pool sweep body 20, as illustrated in the cross section of FIG. 2 and individually in FIGS. 31-33.

Figure 2:
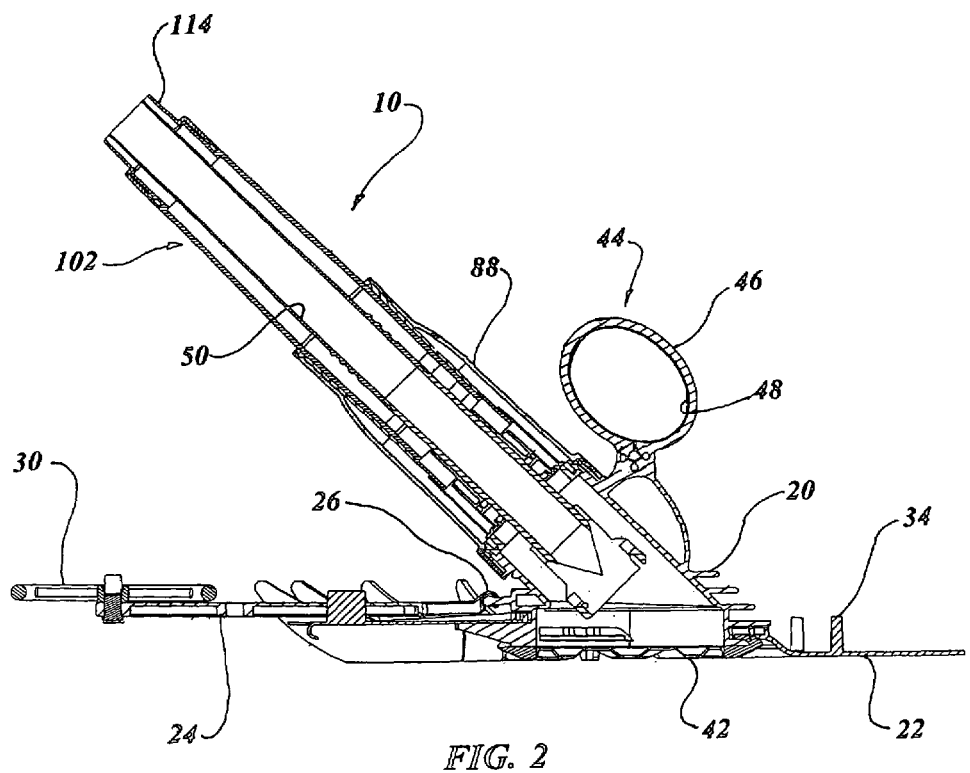
FIG. 2 is a cross sectional view taken along lines 2-2 of FIG. 1.
Figure 3:
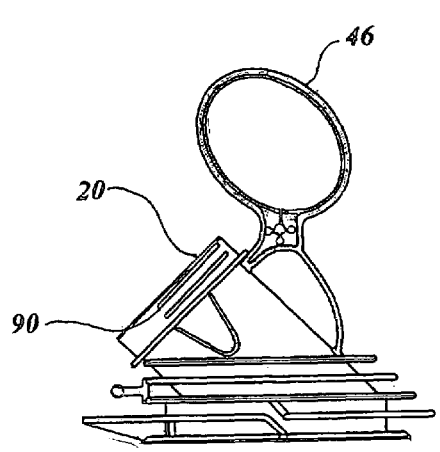
FIG. 3 is a side view of the lower pool sweep body in the preferred embodiment.

The lower pool sweep body 20, as illustrated separately in FIG. 3, incorporates, a float 44 consisting of an integral attachment ring 46 with a hollow elliptical balancer 48 snapped inside, as shown in FIGS. 1-3, providing automatic uprighting in the event the pool sweep 10 turns upside down during movement on a pool bottom or sides.

An integrated valve 50 contains preliminary pre-selected flow adjustment and is removeably installed within the lower pool sweep body 20 providing the pulsating effect to propel the pool sweep 10 within a pool when water is drawn by the pool pumping system into the sweep 10.

Figure 5:
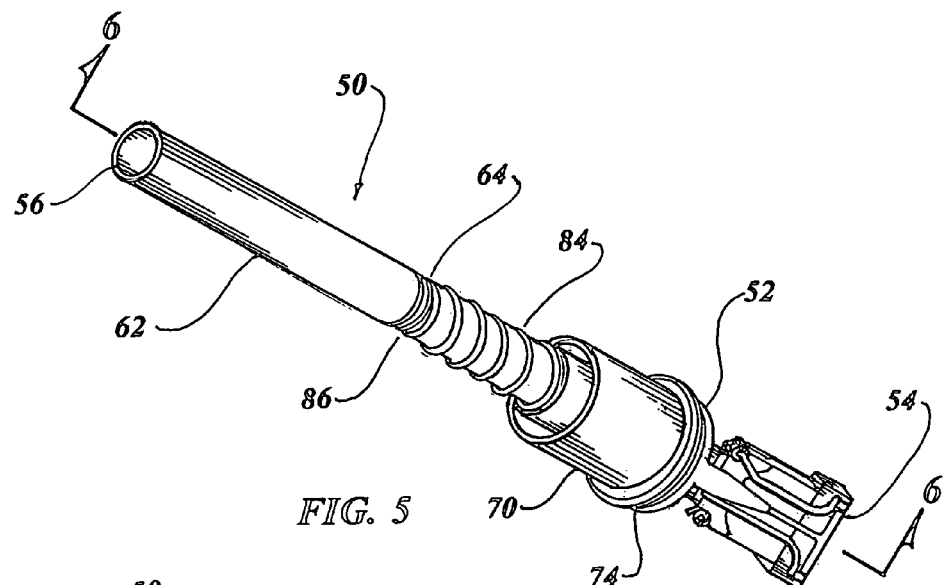
FIG. 5 is a partial isometric view of the integrated valve in the preferred embodiment.
Figure 6:
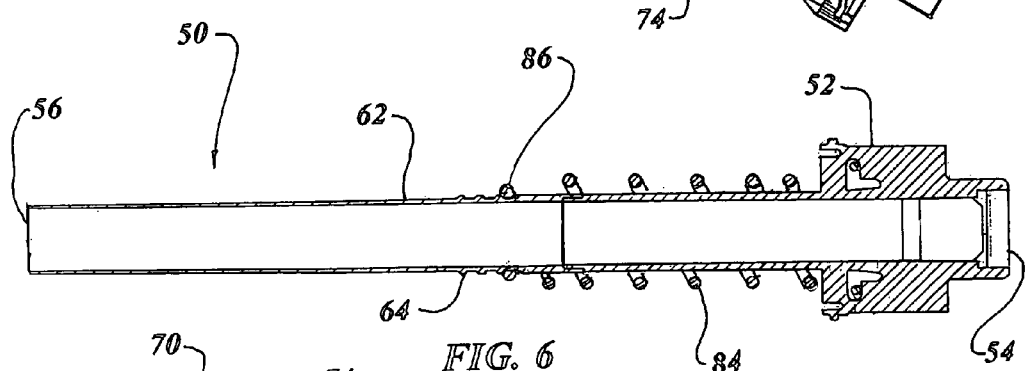
FIG. 6 is a cross sectional view taken along lines 6-6 of FIG. 5.
Figure 7:
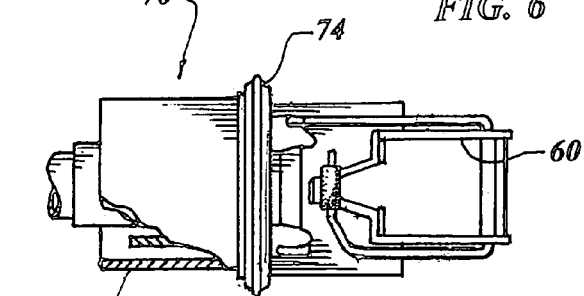
FIG. 7 is a partial cutaway top elevation view of the valve body showing the valve plates in the preferred embodiment
Figure 8:
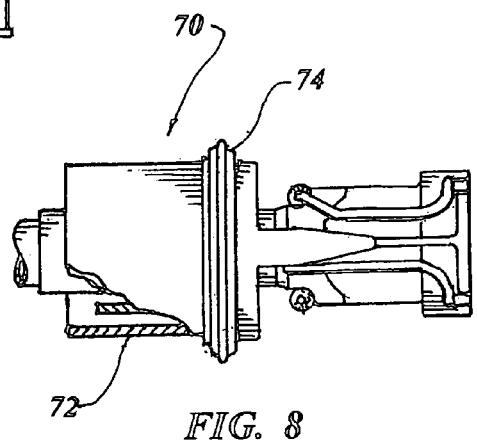
FIG. 8 is a partial cutaway side elevation view of the valve body showing the valve plates in the preferred embodiment

The integrated valve 50, depicted in FIGS. 5-8, consists of an integrated valve body 52 having an inlet end inlet end 54 and an outlet end 56, with the inlet end 54 incorporating a pair of fulcrum points 58 and a pair of restricting boundaries 60 for retaining and confining valve movements. The valve body outlet end 56 has an outlet tube 62 attached for extending the valve body length. The outlet tube 62 includes a number of spring retaining grooves 64, preferably three as illustrated in FIGS. 5 and 6, located adjacent to the valve body outlet end 56.

A pair of opposed rigid stainless steel valve plates 66, depicted in FIGS. 7, 8, and 15-17, are disposed on the valve body inlet end 54, with each valve plate 66 engaging the fulcrum point 58 and respective restricting boundary 60 with each plate 66 rotating inwardly on the fulcrum point until the ends touch when urged by negative fluid pressure applied to the pool sweep through the valve body 52. A pair of stainless steel torsion springs 68, shown individually in FIGS. 18 and 19, surround the restricting boundary's 60 interfacing with each valve plate 66. The torsion springs 68 hold each valve plate 66 tightly against the valve body 52 returning the pair of valve plates 66 to a parallel position after engagement when fluid pressure is relived.

The integrated valve 50 further contains a relief valve 70 which opens, when the valve plates 66 engage under negative water pressure, producing an inter-reaction between valve plate 66 engagements and opening of the relief valve 70 creating pulsation of the sweep 10. The relief valve 70 has a valve body 72, which includes an flange 74 formed on its end, disposed inside the upper pool sweep body 20 engaging the valve body 72 in a sliding fit from the outlet end 56.

A recessed register 76 is formed in the relief valve 70 adjacent to the flange 74, and a recessed sealing seat 78 is formed on an upstream inside portion, of the relief valve 70 spaced away from the flange 74, as illustrated in FIGS. 2 and 12-14.

A relief valve cap 80 illustrated in FIG. 11, is disposed into the recessed register 76 and is sized to slide over the valve body outlet end 56. A relief valve floating gasket 82 shown in FIG. 10 is sized to slip over the valve body outlet end 56 and mate on a first side with the relief valve cap 80 and with the recessed sealing seat 78 on a second side, floating therebetween when the relief valve 70 opens and closes.

A stainless steel compression spring 84, having a convolute taper 86 on a first end, interfaces with an appropriate spring retaining groove 64 for preliminary pre-selected flow adjustment. The spring 84 is compressed onto the relief valve 70 on a second end, such that when negative fluid pressure is applied by the pool pump, the ends of the valve plates 66 engage restricting fluid flow, at which point the relief valve 70 opens and releases negative pressure allowing the torsion springs 68 to disengage the valve plates 66. The above action creates a pulsating effect by combined action of the valve plates 66 and the relief valve 70, enabling the pool sweep 10 to be propelled linearly around a swimming pool on a bottom and sides reacting to liquid flow kinetic energy transferring force to the sweep by fluid inertia.

Figure 4:
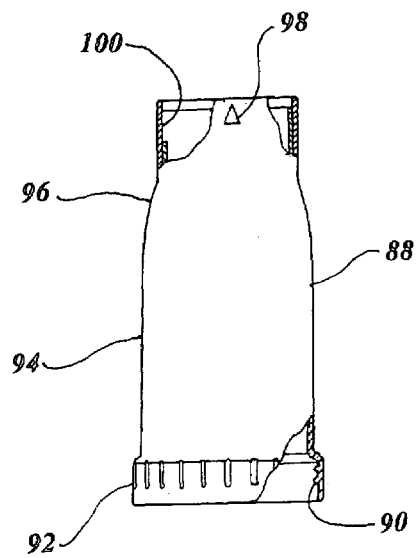
FIG. 4 is a side view of the upper pool sweep body in the preferred embodiment.

An upper pool sweep body 88 is disposed over the integrated valve 50, as shown in cross section of FIG. 2 and individually in FIG. 4, is threadably attached to the lower pool sweep body 20 depicted in FIG. 1. The upper pool sweep body 88 is optionally formed of a transparent material such as polycarbonate, acrylic, nylon, cellulose acetate, polyethylene and polyvinyl-chloride for visualization of the precise flow adjustment, with polycarbonate preferred. However for convenience of manufacture the upper pool sweep body 88 may be formed of an opaque thermoplastic material.

The upper pool sweep body 88 is threadably attached to the lower pool sweep body 20 with male and female threads 90 preferably configured to attach in no more than one quarter turn, as show in FIGS. 3 and 4. The upper pool sweep body 88 utilizes an internally threaded hub 92 on a first end and a straight portion 94 on a second end with a tapered portion 96 in-between. The upper pool sweep body 88 second end incorporates an integral indicia pointer 98 formed on an outside surface and a registering groove 100 formed into the inside surface of the upper pool sweep body 88 directly above the pointer 98, as depicted in FIG. 4.

A flow adjuster 102, illustrated in FIGS. 20 and 22, is slideably disposed within the upper pool sweep body 88 and consists of a flow adjuster body 102a which includes a number of first flow openings 104. A flow gate 106 rotatably disposed over the flow adjuster body 102a and held in place with a retaining ring 102b as shown in FIG. 21. The flow gate 106 includes a like number of second flow openings 108 aligned with the first flow openings 104 in the flow adjuster body 102a. The flow gate 106 interfaces with the upper pool sweep body 88 with the interface consisting of a raised rib 110 on the outside surface of the flow gate 106 slipping into the registered groove 100 in the upper pool sweep body 88 disallowing any rotation movement therebetween.

When the flow adjuster 102 is manually rotated, the second flow openings 108 misalign with the first flow openings 104 providing precise adjustable flow operation of the submersible swimming pool sweep 10 for corresponding with pool requirements when water is drawn therein. Indicia 112 is formed into the outside surface of the flow adjuster 102 in the form of symbols indicating the relationship between the flow adjuster first flow openings 104 and the flow gate second flow openings 108 providing to the user of the pool sweep 10 infinite flow adjustment settings between full flow and no flow.

In order to accommodate a hose on the pool sweep 10 a swivel joint 114 is snapped onto the distal end of the flow adjuster 102 as illustrated in FIGS. 1 and 2 and individually in FIG. 25.

An optional bypass flow screen 116 is configured to fit over the integrated valve inlet end 54 and interface with the lower pool sweep body 20 preventing debris from entering the body 20 when the integrated valve 50 is pulsating.

An optional leaf catching net 118 may be attached in a removable manner to the pool sweep 10 for collecting large debris from the pool surface when the pool sweep is operating. The leaf catching net 118 is illustrated in FIG. 34 and is made of a plastic ring tied with string forming the net.

The lower pool sweep lower body 20, integrated valve 50, upper pool sweep body 88 and flow adjuster 102 are preferably formed of an opaque thermoplastic resin material except for stainless steel elements described above.

In use, the first a preliminary adjustment of the integrated valve 50 is accomplished with the valve 50 made accessible by turning the upper pool sweep body 88 no more than one quarter turn and removing upper pool sweep body 88 and then the valve 50 from the lower pool sweep body 20. According to printed instructions the setting is made by twisting the compression spring 84 into the one of the three appropriate spring retaining grooves 64 in the outlet tube 62 as recommended for the size of the pool to be cleaned.

The valve plates 66 and torsion springs 68 have been designed to respond to a flow of approximately 20 to 30 gallons per minute for maintaining a cyclic rate of 4 to 8 pulses per second which is for normal operation. During development of the valve 50 it was found that if the flow rate was higher that 30 gallons per minute the corresponding pulse rate was too high to shut off, or if the flow is lower than 20 gallons per minute the valve plates 66 would simply stay open. As the flow rate may be critical the adjustment is extremely important however the optimum operation may be observed by the movement of the sweep in the pool and the adjustments are easily made.

It is recommended that if the system is sized a flow rate of 70 to 80 gallons per minute in order to produce the desired sweep movement the compression spring 84 would be set into the upper spring retaining groove 64 which is the weakest spring compression setting. For a flow rate of 50 to 70 gallons per minute in order to produce the desired sweep movement the compression spring 84 would be set into the middle spring retaining groove 64 which is the intermediate spring compression setting. Finally a flow rate of 30 to 50 gallons per minute in order to produce the desired sweep movement the compression spring 84 would be set into the lower spring retaining groove 64 or the highest spring compression setting. This preliminary adjustment permits the sweep to produce an approximate balance with the piping system.

The second or fine tuning adjustment is then completed after reassembling the pool sweep 10. The flow adjuster 102 is manually rotated with one hand while holding upper pool sweep body 88 with the other hand. The pointer 98 located in the upper body aligns with the indicia symbols 112 formed in the flow adjuster 102 which correspond with the position of the flow openings 104 and 108 which vary from fully open to fully closed permitting the final adjustment to match exactly with pool requirements.

While the invention has been described in complete detail and pictorially shown in the accompanying drawings, it is not to be limited to such details, since many changes and modifications may be made to the invention without departing from the spirit and scope thereof. Hence, it is described to cover any and all modifications and forms which may come within the language and scope of the appended claims.

The invention claimed is:

1. An adjustable pulsating submersible swimming pool sweep which comprises, a lower pool sweep body having a resilient skirt attached underneath, an integrated valve disposed within the lower pool sweep body having preliminary pre-selected flow adjustment, an upper pool sweep body disposed over the integrated valve and threadably attached to said lower pool sweep body, and a flow adjuster disposed in the upper pool sweep body, said flow adjuster having first flow openings and a flow gate rotatably disposed over the flow adjuster, said flow gate having second flow openings, when the flow adjuster is manually rotated the second flow openings misalign with the first flow openings providing precise adjustable flow operation.

2. An adjustable pulsating submersible swimming pool sweep which comprises,
   a lower pool sweep body having a resilient skirt attached underneath,
   an integrated valve disposed within the lower pool sweep body providing a pulsating effect when water is drawn by a pool pumping system into the sweep with the integrated valve having preliminary pre-selected flow adjustment,
   an upper pool sweep body disposed over the integrated valve and threadably attached to said lower pool sweep body, and
   a flow adjuster slideably disposed within the upper pool sweep body, said flow adjuster having a plurality of first flow openings therein and a flow gate rotatably disposed over the flow adjuster with the flow gate having a plurality of second flow openings aligned with the first flow openings, wherein the flow gate interfaces with the upper pool sweep body preventing rotation therebetween, such that when the flow adjuster is manually rotated the second flow openings misalign with the first flow openings providing precise adjustable flow operation of the submersible swimming pool sweep to correspond with pool requirements when water is drawn into the sweep.

3. The adjustable pulsating submersible swimming pool sweep as recited in claim 2 wherein said lower pool sweep body further comprises, a hinged deflector arm attached to both the lower pool sweep body and the resilient skirt.

4. The adjustable pulsating submersible swimming pool sweep as recited in claim 3 wherein said hinged deflector arm contains a rotatable deflector wheel on a distal end, such that when the pool sweep is being propelled within a pool direction is changed when the wheel on the deflector arm touches an obstruction permitting the pool sweep to continue operation.

5. The adjustable pulsating submersible swimming pool sweep as recited in claim 2 wherein said resilient skirt further comprises a flat rear portion, with a plurality of posts, and a raised front portion, having a plurality of integrally formed fins and an arm attaching upstanding finger, with an offset in-between permitting debris to be swept from pool walls and bottom by turbulent water flow across the raised portion and the rear portion of the resilient skirt holding the pool cleaner tightly against submerged surfaces of a pool with negative pressure created by a pool filtration systems extracting water from beneath the resilient skirt.

6. The adjustable pulsating submersible swimming pool sweep as recited in claim 2 further comprising, a shoe for attachment of the resilient skirt to the lower pool sweep body.

7. The adjustable pulsating submersible swimming pool sweep as recited in claim 2 wherein said lower pool sweep body further comprises, a float consisting of an integral attachment ring with an elliptical balancer snapped therein providing automatic uprighting in the event the pool sweep turns upside down during movement on a pool bottom or sides.

8. The adjustable pulsating submersible swimming pool sweep as recited in claim 2 wherein said integrated valve further comprises a valve body having fulcrum points and a pair of opposed valve plates engaging the fulcrum points such that each valve plate rotates inwardly on the fulcrum point until valve plate ends engage, as urged by negative fluid pressure, and a pair of torsion springs interface with each valve plate, returning each valve plate to a parallel position after engagement when fluid pressure is relived.

9. The adjustable pulsating submersible swimming pool sweep as recited in claim 8 further comprising a relief valve having a relief valve opening, when the valve plates engage, a relief valve floating gasket mates on a first side with a relief valve cap and with a recessed sealing seat integral with the relief valve on a second side floating therebetween when the relief valve opens and closes, and a compression spring having a convoluted taper on a first end interfacing with an appropriate spring retaining groove formed into the integrated valve and on a second end interfacing with the relief valve for preliminary pre-selected flow adjustment.

10. The adjustable pulsating submersible swimming pool sweep as recited in claim 2 wherein said integrated valve further comprises,
    an integrated valve body having an inlet end, and an outlet end, wherein said inlet end having a pair of fulcrum points and a pair of restricting boundaries for retaining and confining valve movements,
    said valve body outlet end having an outlet tube attached thereto which extends the valve body length, the outlet tube having a plurality of spring retaining grooves therein adjacent to the valve body outlet end, a pair of opposed rigid stainless steel valve plates on the valve body inlet end, with each valve plate contiguously engaging the fulcrum point and respective restricting boundary such that each plate rotates inwardly on the fulcrum point until plate ends intimately engage when urged by negative fluid pressure applied to the pool sweep through the valve body, and a pair of stainless steel torsion springs surrounding each restricting boundary interfacing with each valve plate, holding each valve plate tightly against the valve body returning each valve plate to a parallel position after engagement when fluid pressure is relived.

11. The adjustable pulsating submersible swimming pool sweep as recited in claim 10 wherein said integrated valve further comprises, a relief valve which opens, when the valve plates intimately engage under negative water pressure, producing an inter-reaction between valve plate engagement and opening of the relief valve creating pulsation of the sweep, said relief valve having a valve body, with a flange, disposed inside the upper pool sweep body engaging the flange with a sliding fit onto the valve body outlet end, said relief valve having a recessed register formed adjacent to the flange, and a recessed sealing seat on an upstream inside portion, spaced away from the flange, a relief valve cap disposed into the recessed register and sized to slide over the valve body outlet end, a relief valve floating gasket sized to slip over the valve body outlet end and mate on a first side with the relief valve cap and with the recessed sealing seat on a second side, floating therebetween when the relief valve opens and closes, and a stainless steel compression spring having a convolute taper on a first end for interfacing with an appropriate spring retaining groove for preliminary pre-selected flow adjustment, and the spring is compressed onto the relief valve on a second end, such that when negative fluid pressure is applied by a pool pump the valve plate ends engage restricting fluid flow, at which point the relief valve opens and releases negative pressure allowing the torsion springs to disengage the valve plates creating a pulsating effect by combined action of the valve plates and the relief valve, enabling the pool sweep to be propelled linearly around a swimming pool on a bottom and sides reacting to liquid flow kinetic energy transferring force to the sweep by fluid inertia.

12. The adjustable pulsating submersible swimming pool sweep as recited in claim 2 wherein said upper pool sweep body is formed of a transparent material selected from the group consisting of polycarbonate, acrylic, nylon, cellulose acetate, polyethylene and polyvinyl-chloride for visualization of the precise flow adjustment.

13. The adjustable pulsating submersible swimming pool sweep as recited in claim 2 wherein said upper pool sweep body is threadably attached to the lower pool sweep body with male and female threads configured to attach in no more than one quarter turn.

14. The adjustable pulsating submersible swimming pool sweep as recited in claim 2 wherein said upper pool sweep body further comprises a internally threaded hub on a first end and a straight portion on a second end with a tapered portion in-between, said second end having an integral indicia pointer formed on an outside surface and a registering groove formed into the inside surface for interfacing with the flow gate preventing rotation of the flow gate with the upper pool sweep body.

15. The adjustable pulsating submersible swimming pool sweep as recited in claim 14 wherein said flow gate further comprises a rib for interfacing with registering groove formed into the inside surface of the upper pool sweep body for interfacing with the flow gate to prevent rotation therebetween.

16. The adjustable pulsating submersible swimming pool sweep as recited in claim 2 wherein said flow adjuster further comprises indicia formed on an outside surface with the indicia in the form of symbols indicating the relationship between the flow adjuster first flow openings and the flow gate second flow openings indicating precise flow adjustment settings.

17. The adjustable pulsating submersible swimming pool sweep as recited in claim 2 further comprises a bypass flow screen configured to fit over the integrated valve inlet end and interface with the lower pool sweep body preventing debris from entering the body when the integrated valve is pulsating.

18. The adjustable pulsating submersible swimming pool sweep as recited in claim 2 further comprises a leaf catching screen attached in a removable manner to the pool sweep for collecting large debris from the pool surface when the pool sweep is operating.

19. The adjustable pulsating submersible swimming pool sweep as recited in claim 2 wherein said lower pool sweep lower body, integrated valve, upper pool sweep body and flow adjuster are formed of an opaque thermoplastic resin material except for stainless steel elements.

* * * * *